United States Patent
De Goes et al.

(10) Patent No.: US 10,818,059 B1
(45) Date of Patent: Oct. 27, 2020

(54) SCULPT TRANSFER

(71) Applicant: Pixar, Emeryville, CA (US)

(72) Inventors: Fernando Ferrari De Goes, Berkeley, CA (US); Alonso Martinez, Berkeley, CA (US); Michael B. Comet, Concord, CA (US); Patrick Coleman, Oakland, CA (US)

(73) Assignee: Pixar, Emeryville, CA (US)

( * ) Notice: Subject to any disclaimer, the term of this patent is extended or adjusted under 35 U.S.C. 154(b) by 0 days.

(21) Appl. No.: 16/514,852

(22) Filed: Jul. 17, 2019

(51) Int. Cl.
*G06T 13/20* (2011.01)
*G06T 17/20* (2006.01)
*G06T 13/40* (2011.01)

(52) U.S. Cl.
CPC .............. *G06T 13/20* (2013.01); *G06T 13/40* (2013.01); *G06T 17/205* (2013.01)

(58) Field of Classification Search
CPC ....... G06T 13/20; G06T 13/40; G06T 17/205; G06T 19/00; G06T 19/20; G06T 2219/2024
See application file for complete search history.

(56) References Cited

U.S. PATENT DOCUMENTS

| 8,054,311 | B1 * | 11/2011 | Sheffler | G06T 13/40 345/419 |
| 8,290,757 | B2 * | 10/2012 | Irving | G06T 13/20 703/6 |
| 9,245,176 | B2 * | 1/2016 | Matthews | G06T 13/40 |
| 10,565,792 | B2 * | 2/2020 | Bailey | G06T 13/40 |
| 2019/0266796 | A1 * | 8/2019 | Comer | B63B 79/10 |

OTHER PUBLICATIONS

Lewis, John P., Matt Cordner, and Nickson Fong. "Pose space deformation: a unified approach to shape interpolation and skeleton-driven deformation." Proceedings of the 27th annual conference on Computer graphics and interactive techniques. 2000. (Year: 2000).*
Magnenat-Thalmann, Nadia, et al. "Modeling of bodies and clothes for virtual environments." 2004 International Conference on Cyberworlds. IEEE, 2004. (Year: 2004).*
Sumner, R., Popovic, J. "Deformation Transfer for Triangle Meshes", SIGGRAPH, 2004, 7 pages.

* cited by examiner

*Primary Examiner* — Daniel F Hajnik
(74) *Attorney, Agent, or Firm* — Patterson + Sheridan, LLP (57) ABSTRACT

Embodiments provide for sculpt transfer. Embodiments include identifying a source polygon of a source mesh that corresponds to a target polygon of a target mesh. Embodiments include determining a first matrix defining a first rotation that aligns a target rest state of the target polygon to a source rest state of the source polygon, determining a second matrix defining a linear transformation that aligns the source rest state to a source pose of the source polygon, wherein the linear transformation comprises rotating and stretching, determining a third matrix defining a second rotation that aligns the source pose to the target rest state, and determining a fourth matrix defining a third rotation that aligns the source rest state to the source pose. Embodiments include determining a target pose of the target polygon based on the target rest state, the first matrix, the second matrix, the third matrix, and the fourth matrix.

20 Claims, 5 Drawing Sheets

SCULPT TRANSFER

BACKGROUND

This disclosure relates to computer animation and computer generated imagery. More specifically, this disclosure relates to techniques for transferring sculpts between different meshes.

Animators and computer graphics artists can rely upon computers to assist in the animation and computer generated imagery process. This may include using computers to represent shapes with virtual models in computer memory. This may also include using computers to facilitate animation, for example, by the designing, posing, deforming, coloring, painting, or the like, of characters or other computer-generated models.

The production of animated features and computer generated imagery (CGI) may involve the extensive use of computer graphics techniques to produce a visually appealing image from the geometric description of an object or model that can be used to convey an element of a story. One issue with the production process is the time and effort involved when an animator undertakes to create the geometric description of a model and the model's associated sculpts, textures, paint data, and the like. For example, sculpts are often defined as a difference or delta between a "rest" state of a mesh and a "pose" of the mesh in which vertices of the mesh are in different positions. A sculpt is used for an animation in which the mesh transforms from the rest state to the pose. In some cases, it may take several hours to several days for an animator to create a sculpt for a model.

Accordingly, there is a need in the art for techniques of transferring sculpts between three-dimensional models with different meshes.

SUMMARY

Embodiments include a method for sculpt transfer, comprising: identifying a source polygon of a source mesh that corresponds to a target polygon of a target mesh; determining a first matrix defining a first rotation that aligns a target rest state of the target polygon to a source rest state of the source polygon; determining a second matrix defining a linear transformation that aligns the source rest state to a source pose of the source polygon, wherein the linear transformation comprises rotating and stretching determining a third matrix defining a second rotation that aligns the source pose to the target rest state; determining a fourth matrix defining a third rotation that aligns the source rest state to the source pose; determining a target pose of the target polygon by: applying the first matrix to the target polygon in the target rest state to produce a first intermediate state of the target polygon; applying the second matrix to the first intermediate state of the target polygon to produce a second intermediate state of the target polygon; applying the third matrix to the second intermediate state of the target polygon to produce a third intermediate state of the target polygon; and applying the fourth matrix to the third intermediate state of the target polygon to produce the target pose; and generating an animation of the target mesh based on the target rest state and the target pose.

Other embodiments include a non-transitory computer readable medium comprising instructions that, when executed by one or more processors of a computing system, cause the computing system to perform the method for sculpt transfer described above.

Other embodiments include a system comprising one or more processors and a non-transitory computer readable medium comprising instructions that, when executed by the one or more processors, cause the system to perform the method for sculpt transfer described above.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

A three-dimensional model may be represented by a mesh comprising a collection of vertices, edges, and faces defining the shape of a polyhedral object. The faces may be triangles, quadrilaterals, or other types of polygons. Meshes are used as a reference point for defining various attributes of three-dimensional models, such as sculpts. In one example, a sculpt includes a change from a rest state to a pose for a mesh. An animator generally creates a sculpt by defining the positions of vertices for both the rest state and the pose. The delta values between the rest state and the pose for each vertex of the mesh are generally stored in association with a model as sculpt data, and are used to animate the model.

Creating sculpts for models is generally a time-consuming process. As such, embodiments of the present disclosure involve techniques for transferring a sculpt from a source mesh to a target mesh so that sculpts may be shared or reused across different models. In particular, techniques described herein involve determining local rotation and stretching separately for each face of a source mesh and target mesh in order to transfer a sculpt from the source mesh to the target mesh in a way that accounts for differences between the source mesh and the target mesh. As such, embodiments of the present disclosure produce a result that preserves the proportions of the target mesh when the sculpt is transferred.

Figure 1:
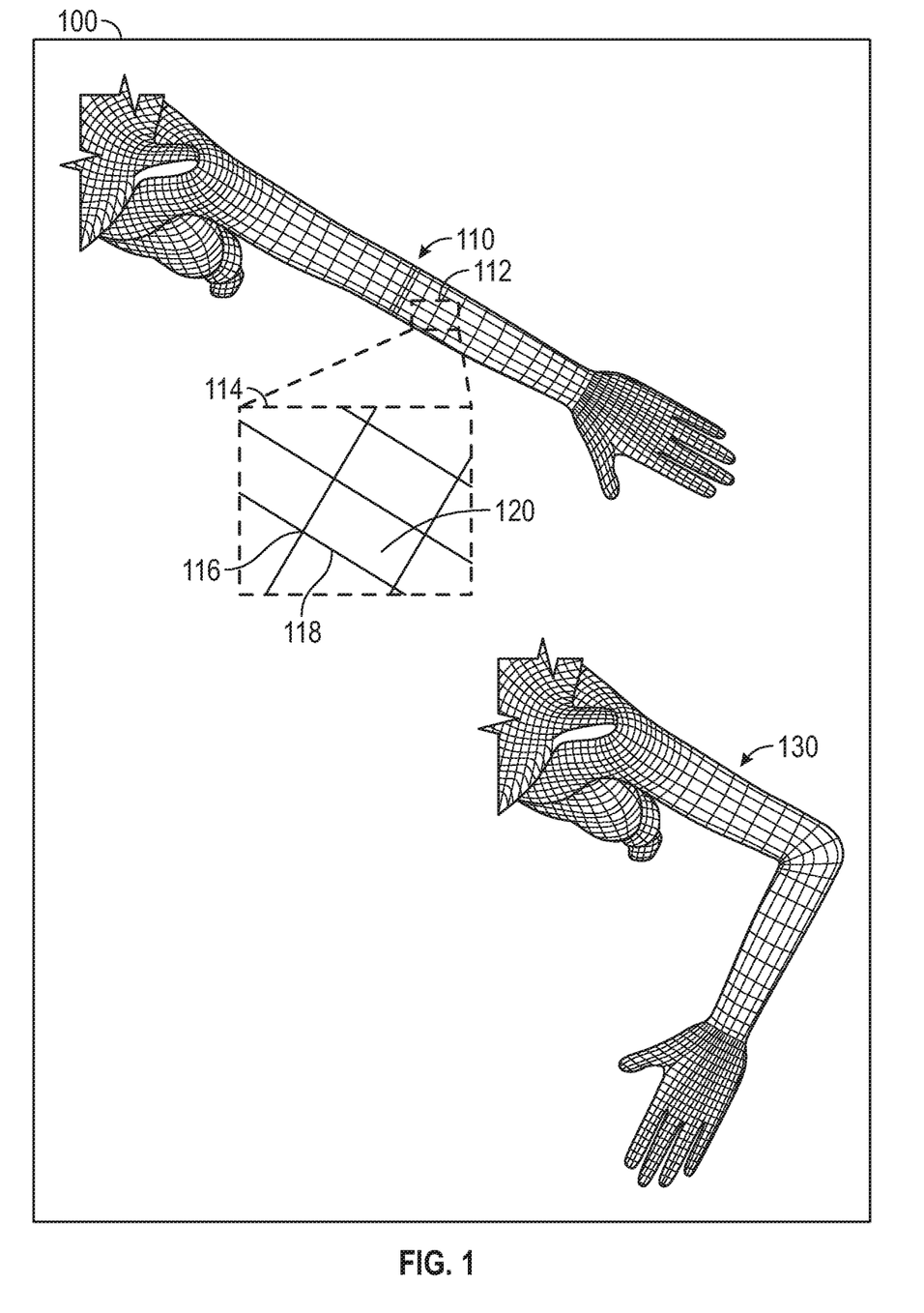
FIG. 1 illustrates an example of a sculpt for a source mesh.

FIG. 1 illustrates an example 100 of a source rest state 110 and a source pose 130 of a source mesh. The source mesh generally represents a mesh from which a sculpt is transferred to a target mesh using techniques described herein.

Example 100 includes source rest state 110 of the source mesh, the source mesh including a plurality of vertices, edges, and faces. Region 112 of the source mesh is magnified at 114, where a vertex 116, an edge 118, and a face 120 of the source mesh are shown. In source rest state 110, the source mesh represents a human arm in an extended position.

Example 100 also includes source pose 130 of the source mesh. In source pose 130, the source mesh represents the human arm in a bent position. Source pose 130 may have been created by adjusting the positions of vertices in the source mesh, such as by an animator. The deltas between each vertex of the source mesh in source rest state 110 and their corresponding vertices in source pose 130 generally represent a sculpt that is stored in association with a model to which the source mesh corresponds. For instance, a delta for a given vertex generally comprises x, y, and z values representing a distance in three-dimensional space between the given vertex in source rest state 110 and its corresponding vertex in source pose 130.

The sculpt represented in example 100 may be used to animate the source mesh from source rest state 110 to source pose 130.

Figure 2:
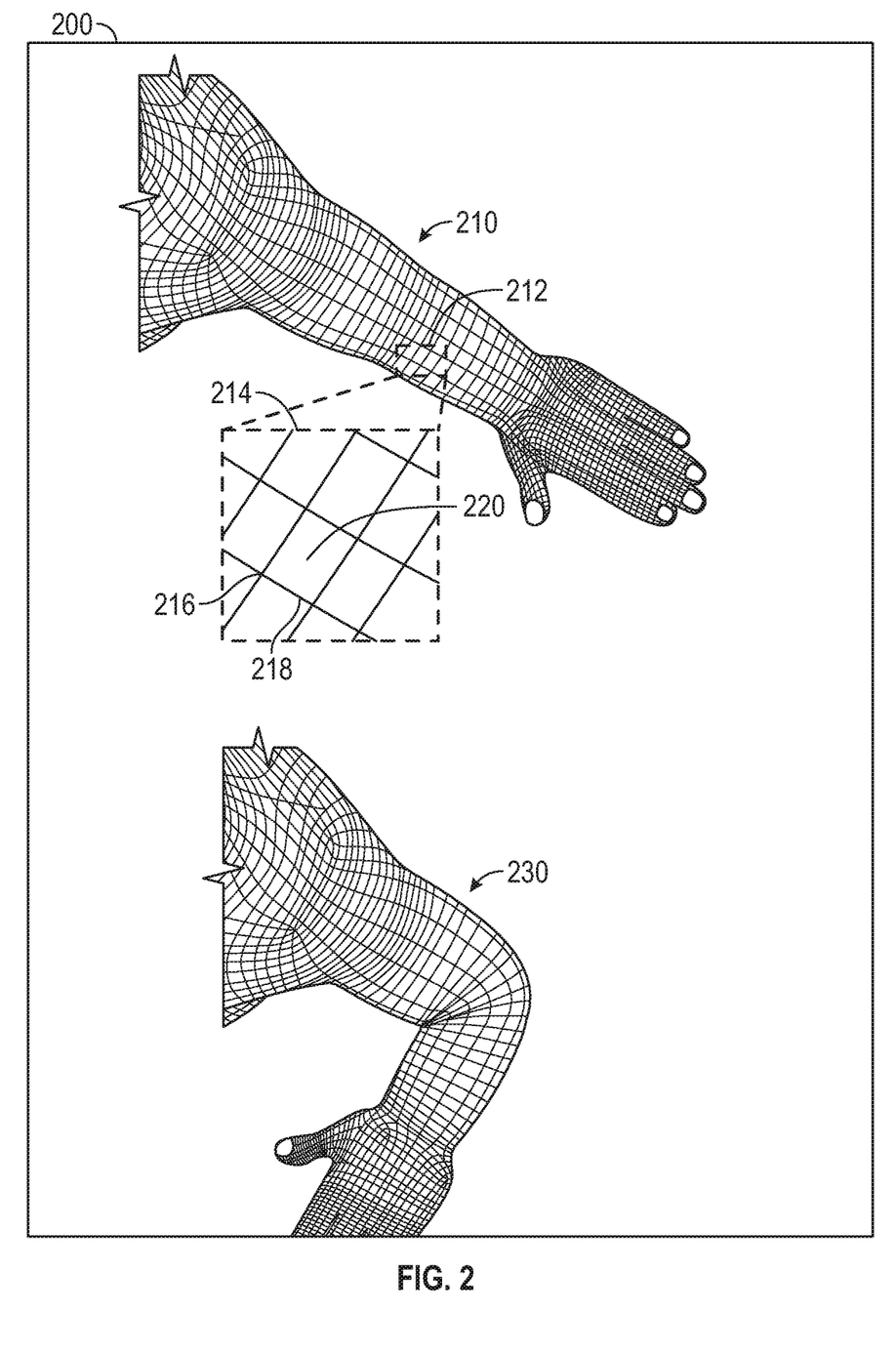
FIG. 2 illustrates an example of a sculpt transferred to a target mesh.

FIG. 2 illustrated an example 200 of a target rest state 210 and a target pose 230 of a target mesh. The target mesh generally represents a mesh to which a sculpt is transferred from a source mesh using techniques described herein.

Example 200 includes target rest state 210 of the target mesh, the target mesh including a plurality of vertices, edges, and faces. Region 212 of the target mesh is magnified at 214, where a vertex 216, an edge 218, and a face 220 of the target mesh are shown. In target rest state 210, the target mesh represents a human arm in an extended position. In certain embodiments, the target mesh shown in example 200 has the same connectivity of the source mesh shown in example 100 of FIG. 1, meaning that each vertex, edge, and face in the target mesh has a corresponding vertex, edge, and face in the source mesh. For example, vertex 216, edge 218, and face 220 of the target mesh may correspond to vertex 116, edge 118, and face 120 of the source mesh in FIG. 1. However, the human arm represented by the target mesh in example 200 has different proportions than the human arm depicted in the source mesh shown in example 100 of FIG. 1. The vertices of the target mesh in example 200 are spaced differently in three-dimensional space than their corresponding vertices in the source mesh in example 100 of FIG. 1.

Example 200 also includes target pose 230 of the target mesh, which generally represents the results of techniques described herein for transferring a sculpt from a source mesh to a target mesh. In target pose 230, the target mesh represents the human arm in a bent position. Target pose 230 in example 200 is generated by transferring the sculpt from the target mesh represented in example 100 to the target mesh of example 200 while preserving the proportions of the target mesh. Techniques by which target pose 230 may be determined are explained in more detail below with respect to FIGS. 3A and 3B.

Figure 3A:
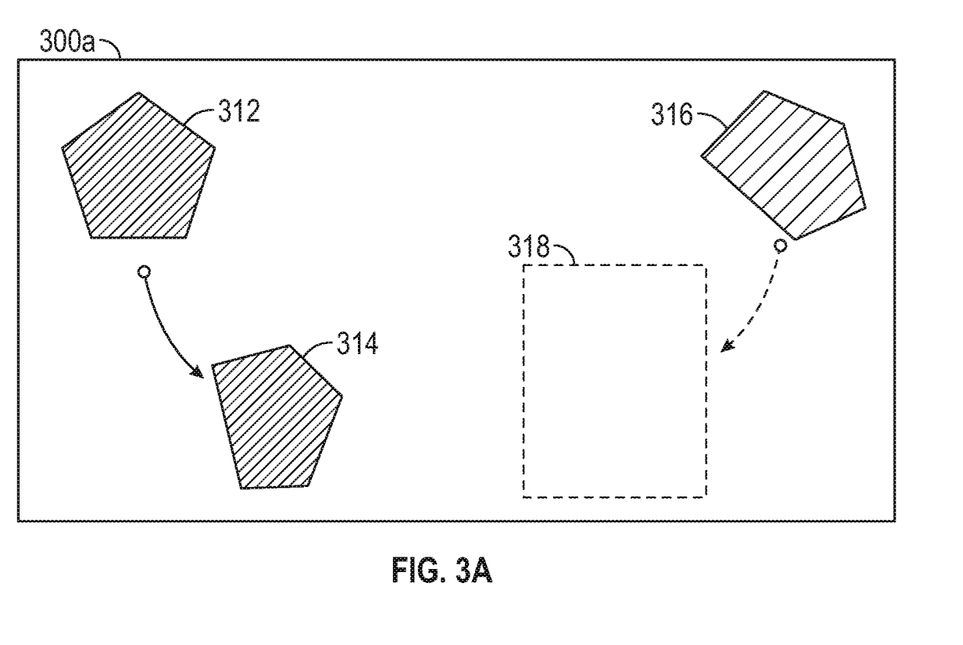
FIGS. 3A and 3B illustrate examples of techniques for transferring a sculpt from a source mesh to a target mesh.

FIG. 3A illustrates an example 300a related to techniques for transferring a sculpt from a source mesh to a target mesh.

Example 300a includes a source rest state 312 and a source pose 314 of a source polygon from a source mesh. In some embodiments, the source polygon is a face of the source mesh. Faces may take a variety of shapes, such as quadrilaterals (e.g., face 120 of FIG. 1 and face 220 of FIG. 2), triangles, pentagons (as shown in example 300a), and other polygons.

Example 300a also includes a target rest state 316 of a target polygon of a target mesh. The target polygon shown in target rest state 316 is a face of the target mesh that corresponds to the source polygon of the source mesh shown in source rest state 312 and source pose 314. Techniques described herein involve transferring the sculpt comprising the deltas between source rest state 312 and source pose 314 to the target mesh to produce a target pose (e.g., represented by space 318), as described below with respect to FIG. 3B.

Figure 3B:
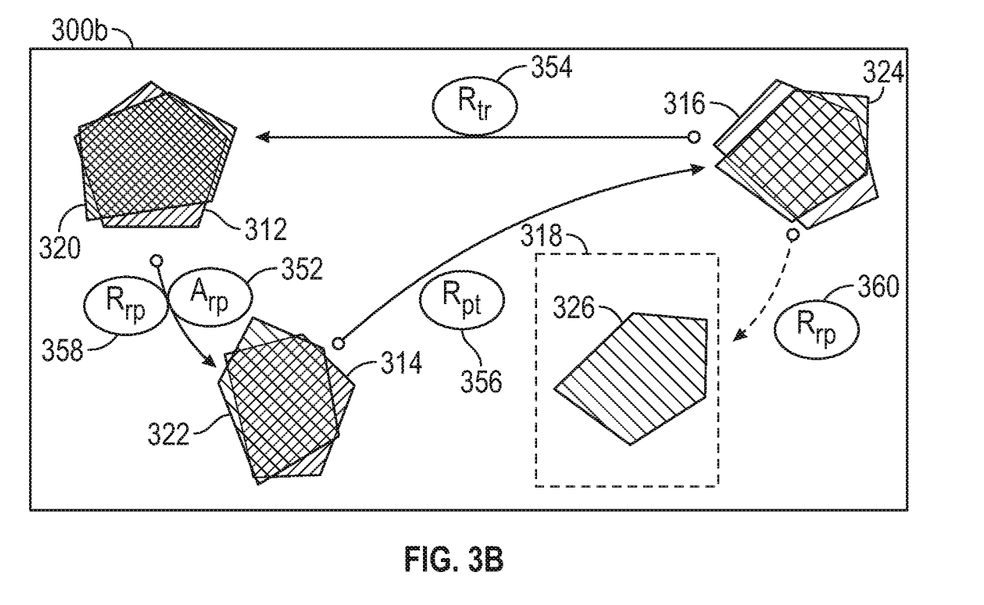

FIG. 3B illustrates another example 300b related to techniques for transferring a sculpt from a source mesh to a target mesh.

Example 300b includes source rest state 312, source pose 314, target rest state 316, and space 318 of FIG. 3A.

The deltas between source rest state 312 and source pose 314 represent a sculpt to be transferred from the source polygon to the target polygon. In order to transfer the sculpt to the target polygon while preserving proportions of the target polygon, a series of matrices are determined.

At 352, a matrix $A_{rp}$ is determined. $A_{rp}$ represents a linear transformation including rotation and stretching that, when applied to source rest state 312, results in source pose 314. In some embodiments, $A_{rp}$ is a three-by-three matrix, a first row representing in-plane rotation, a second row representing stretching, and a third row representing out-of-plane rotation. In-plane rotation generally refers to rotation about an axis that runs perpendicular to the viewpoint from which the model is rendered, while out-of-plane rotation refers to rotation about other axes.

One technique of transferring the sculpt to the target polygon would be to simply apply $A_{rp}$ to target rest state 316, as is done in existing techniques. However, this may not achieve the best result, as $A_{rp}$ does not take into account differences between the source polygon and the target polygon, being based only on source rest state 312 and source pose 314. As such, techniques described herein involve the use of additional matrices that account for the differences between the source polygon and the target polygon.

At 354, a matrix $R_{tr}$ is determined. $R_{tr}$ represents rotation that generally aligns target rest state 316 to source rest state 312. In some embodiments, $R_{tr}$ is a three-by-three matrix, a first row representing in-plane rotation, a second row representing no stretching (e.g., a row of ones so that no stretching is performed), and a third row representing out-of-plane rotation. While $A_{rp}$ involves both rotation and stretching, $R_{tr}$ involves only rotation. $R_{tr}$ will be used as part of a process for transferring the sculpt from the source polygon to the target polygon.

At 356, a matrix $R_{pt}$ is determined. $R_{pt}$ represents rotation that generally aligns source pose 314 to target rest state 316. In some embodiments, $R_{pt}$ is a three-by-three matrix, a first row representing in-plane rotation, a second row representing no stretching (e.g., a row of ones so that no stretching is performed), and a third row representing out-of-plane rotation. Like $R_{tr}$, $R_{pt}$ involves only rotation. $R_{pt}$ will also be used as part of the process for transferring the sculpt from the source polygon to the target polygon.

At 358, a matrix $R_{pt}$ is determined. $R_{rp}$ represents rotation that generally aligns source rest state 312 to source pose 314. In some embodiments, $R_{rp}$ is a three-by-three matrix, a first row representing in-plane rotation, a second row representing no stretching (e.g., a row of ones so that no stretching is performed), and a third row representing out-of-plane rotation. $R_{rp}$ is similar to $A_{rp}$, except that $R_{rp}$ only includes rotation. $R_{rp}$ will also be used as part of the process for transferring the sculpt from the source polygon to the target polygon.

In some embodiments, $A_{rp}$, $R_{tr}$, $R_{pt}$, and $R_{rp}$ are determined using singular value decomposition (SVD). SVD is a matrix decomposition method in which a matrix is reduced to its constituent parts in order to make certain subsequent matrix calculations simpler.

After matrices $A_{rp}$, $R_{tr}$, $R_{pt}$, and $R_{rp}$ have been determined, they are used to transfer the sculpt from the source polygon to the target polygon. In some embodiments, $R_{tr}$ is first applied to target rest state 316 of the target mesh to produce intermediate state 320. Next, $A_{rp}$ is applied to intermediate state 320 to produce intermediate state 322. Subsequently, $R_{pt}$ is applied to intermediate state 322 to produce intermediate state 324. Finally, $R_{rp}$ is applied to intermediate state 324 to produce target pose 326.

The deltas between target rest state 316 and target pose 326 are stored as sculpt data associated with the model corresponding to the target polygon. In some embodiments, the process depicted in examples 300a and 300b is repeated for each face of the target mesh in order to transfer the sculpt from the source mesh to the target mesh.

For instance, the process described with respect to examples 300a and 300b may be performed for each face of the target mesh depicted in example 200 of FIG. 2, such as face 220 of FIG. 2, with respect to each face of the source mesh depicted in example 100 of FIG. 1, such as face 120 of FIG. 1, in order to produce target pose 230 of FIG. 2. The deltas for each vertex of the target mesh, such as vertex 216 of FIG. 2, between target rest state 210 and target pose 230 of FIG. 2 are stored as sculpt data associated with a model to which the target mesh corresponds.

Figure 4:
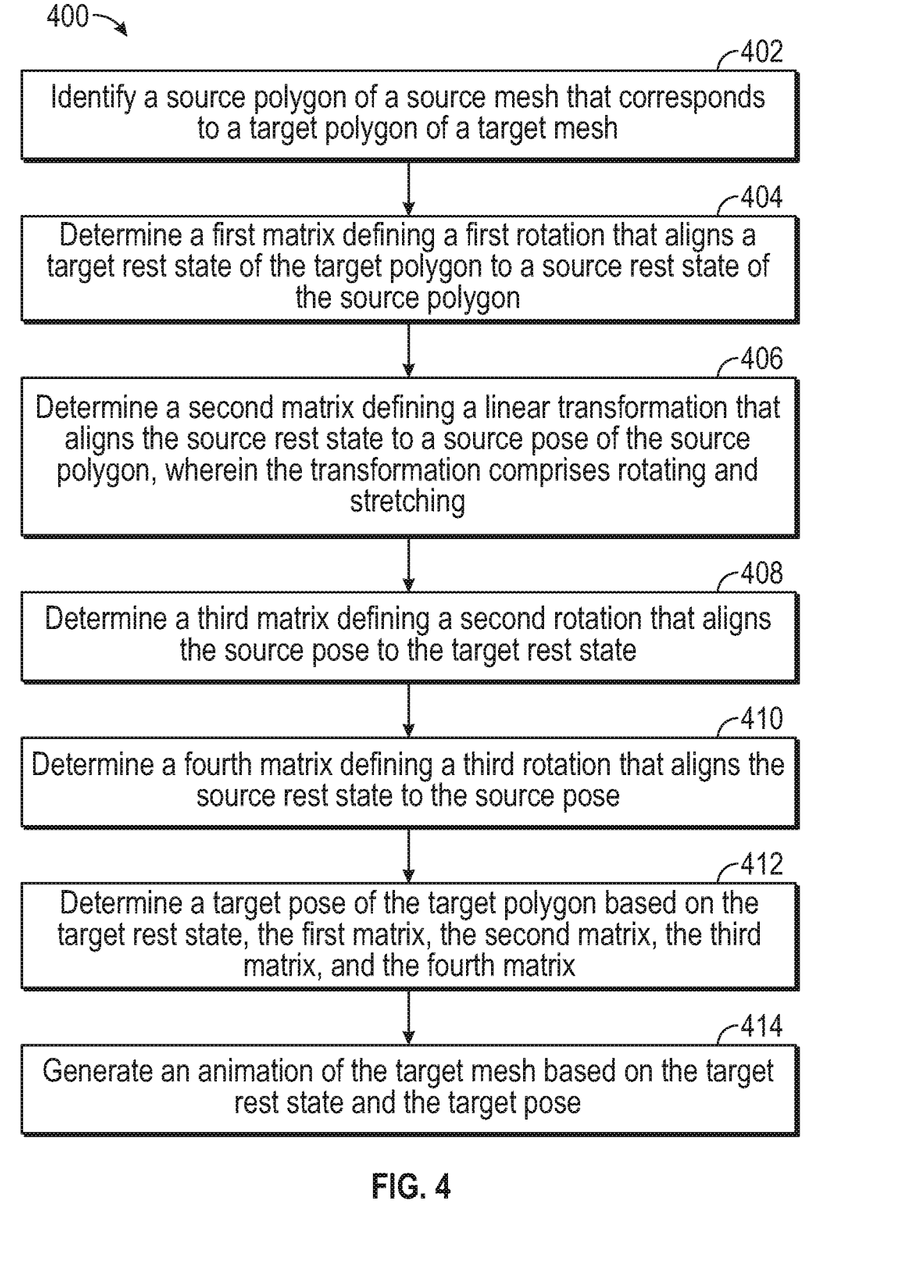
FIG. 4 illustrates example operations for transferring a sculpt from a source mesh to a target mesh.

FIG. 4 illustrates example operations 400 for transferring a sculpt from a source mesh to a target mesh. In some embodiments, operations 400 are performed by a computing system, such as computing system 500 of FIG. 5, as described in more detail below.

At 402, a source polygon of a source mesh is identified that corresponds to a target polygon of a target mesh. In some embodiments, the source mesh and the target mesh have the same connectivity, and each face of the source mesh has a corresponding face in the target mesh. If two meshes have the same connectivity, then each vertex, edge, and face of one mesh has a corresponding vertex, edge, or face in the other mesh. The source polygon generally represents a face in the source mesh and the target polygon generally represents a corresponding face in the target mesh.

At 404, a first matrix is determined that defines a first rotation that aligns a target rest state of the target polygon to a source rest state of the source polygon. In some embodiments, the first matrix is $R_{tr}$, and is determined as described with respect to 354 of FIG. 3B. The first matrix generally comprises three rows, including a first row defining in-plane rotation, a second row indicating that no stretching is to be performed (e.g., a row of ones), and a third row defining out-of-plane rotation.

At 406, a second matrix is determined that defines a linear transformation that aligns the source rest state to a source pose of the source polygon, wherein the transformation comprises rotating and stretching. In some embodiments, the second matrix is $A_{rp}$, and is determined as described with respect to 352 of FIG. 3B. The second matrix generally comprises three rows, including a first row defining in-plane rotation, a second row defining stretching, and a third row defining out-of-plane rotation.

At 408, a third matrix is determined that defines a second rotation that aligns the source pose to the target rest state. In some embodiments, the third matrix is $R_{pt}$, and is determined as described with respect to 356 of FIG. 3B. The third matrix generally comprises three rows, including a first row defining in-plane rotation, a second row indicating that no stretching is to be performed (e.g., a row of ones), and a third row defining out-of-plane rotation.

At 410, a fourth matrix is determined that defines a third rotation that aligns the source rest state to the source pose. In some embodiments, the fourth matrix is $R_{rp}$, and is determined as described with respect to 358 of FIG. 3B. The fourth matrix generally comprises three rows, including a first row defining in-plane rotation, a second row indicating that no stretching is to be performed (e.g., a row of ones), and a third row defining out-of-plane rotation.

In some embodiments, the first matrix, the second matrix, the third matrix, and/or the fourth matrix are determined using singular value decomposition (SVD). Computing the first, second, third, and fourth matrix (each represented by A) generally involves minimizing a quadratic equation of the form $\Sigma_{(ij)}|A(xi-xj)-(yi-yj)|^2$, where (i,j) is an edge of a mesh face, x is the position at the initial mesh and y at the final rest. This optimization is a simple linear regression problem (aka linear least-squares). Once A is computed, the rotation and stretching associated with A can be computed using SVD. More specifically, the SVD of A is of the form U D V', where U and V are three-dimensional rotation matrices and D is a diagonal matrix with singular values (' indicating transpose). The rotation of A is U V' and the stretch is V D V'.

At 412, a target pose of the target polygon is determined based on the target rest state, the first matrix, the second matrix, the third matrix, and the fourth matrix. In some embodiments, the target pose is determined by applying the first matrix to the target polygon in the target rest state to produce a first intermediate state of the target polygon, applying the second matrix to the first intermediate state of target polygon to produce a second intermediate state of the target polygon, applying the third matrix to the second intermediate state of the target polygon to produce a third intermediate state of the target polygon, and applying the fourth matrix to the third intermediate state of the target polygon to produce the target pose. A polygon can be expressed as a matrix P by stacking the edge vectors (e.g., the position difference between two consecutive vertices) per row. As such, a three-dimensional polygon of N points is encoded by a matrix of size N×3. Because each of the four matrices may be 3×3, a polygon can be deformed by simply multiplying the polygon matrix P by each one of the four matrices from the right, ie, P*A.

In some embodiments, delta values for vertices of the target polygon are determined based on differences between the target rest state and the target pose, and the delta values are stored as sculpt data associated with a target model corresponding to the target mesh. In certain embodiments, a respective target pose is determined for each respective target polygon of the target mesh based on a respective target rest state of the respective target polygon, a respective source rest state of a respective source polygon of the source mesh that corresponds to the respective target polygon, and a respective source pose of the respective source polygon. The respective target pose for each respective target polygon is stored as sculpt data associated with the target model.

At 414, an animation of the target mesh is generated based on the target rest state and the target pose. In some embodiments, the target mesh is animated using the sculpt data determined for each face of the target mesh. The animation generally comprises a transformation from the target rest state to the target pose for each face of the target mesh. For instance, the animation may be a three-dimensional representation of an arm moving from an extended position to a bent position, as shown in example 200 of FIG. 2.

Example Computing System for Sculpt Transfer

Figure 5:
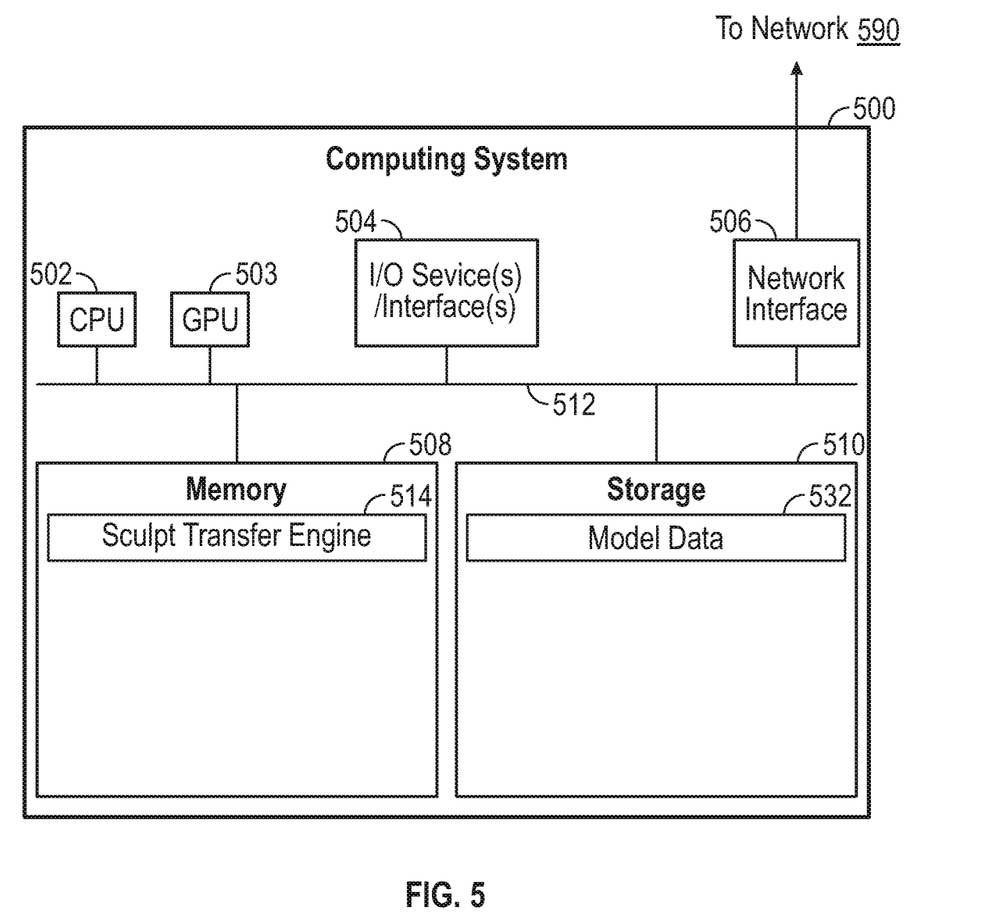
FIG. 5 illustrates an example computing system with which embodiments of the present disclosure may be implemented.

FIG. 5 illustrates an example computing system 500 with which embodiments of the present disclosure may be implemented.

In certain embodiments, computing system 500 performs techniques described herein for transferring a sculpt from a source mesh to a target mesh, such as operations 400 of FIG. 4.

Computing system 500 includes a central processing unit (CPU) 502 and a GPU (graphics processing unit) 503 connected to a data bus 512. CPU 502 and/or GPU 503 are configured to process computer-executable instructions, e.g., stored in memory 508 or storage 510, and to cause computing system 500 to perform methods as described herein, for example with respect to FIG. 4. Though depicted as including one CPU 502 and one GPU 503, computing system 500 may alternatively have a single processor or a plurality of processors.

Computing system 500 further includes input/output device(s) and interface(s) 504, which allows computing system 500 to interface with input/output devices, such as, for example, keyboards, displays, mouse devices, pen input, and other devices that allow for interaction with computing system 500. Note that while not depicted with independent external I/O devices, computing system 500 may connect with external I/O devices through physical and wireless connections (e.g., an external display device).

Computing system 500 further includes network interface 506, which provides computing system 500 with access to external networks, such as network 590, and thereby external computing devices.

Computing system 500 further includes memory 508, which in this example includes sculpt transfer engine 514, which may perform operations described above with respect FIG. 1-4, such as operations 400 of FIG. 4. Note that while shown as a single memory 508 in FIG. 5 for simplicity, the aspects stored in memory 508 may be stored in different physical memories, but all accessible to CPU 502 and/or GPU 503 via data connections, such as bus 512.

Computing system 500 further includes storage 510, which in this example includes model data 532. Model data 532 generally represents data related to models, such as source meshes, target meshes, matrices, rest states, poses, intermediate states, sculpt data, and the like.

While not depicted in FIG. 5, other aspects may be included in storage 510.

As with memory 508, a single storage 510 is depicted in FIG. 5 for simplicity, but the various aspects stored in storage 510 may be stored in different physical storages, but all accessible to CPU 502 and/or GPU 503 via internal data connections, such as bus 512, I/O interfaces 504, or external connection, such as network interface 506.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method for sculpt transfer, comprising:
   identifying a source polygon of a source mesh that corresponds to a target polygon of a target mesh;
   determining a first matrix defining a first rotation that aligns a target rest state of the target polygon to a source rest state of the source polygon;
   determining a second matrix defining a linear transformation that aligns the source rest state to a source pose of the source polygon, wherein the linear transformation comprises rotating and stretching;
   determining a third matrix defining a second rotation that aligns the source pose to the target rest state;
   determining a fourth matrix defining a third rotation that aligns the source rest state to the source pose;
   determining a target pose of the target polygon by:
     applying the first matrix to the target polygon in the target rest state to produce a first intermediate state of the target polygon;
     applying the second matrix to the first intermediate state of the target polygon to produce a second intermediate state of the target polygon;
     applying the third matrix to the second intermediate state of the target polygon to produce a third intermediate state of the target polygon; and
     applying the fourth matrix to the third intermediate state of the target polygon to produce the target pose; and
   generating an animation of the target mesh based on the target rest state and the target pose.

2. The method of claim 1, wherein the first matrix, the second matrix, the third matrix, and the fourth matrix are determined using singular value decomposition (SVD).

3. The method of claim 1, further comprising:
   determining delta values for vertices of the target polygon based on differences between the target rest state and the target pose; and
   storing the delta values as sculpt data associated with a target model corresponding to the target mesh.

4. The method of claim 1, further comprising determining a respective target pose for each respective target polygon of the target mesh based on a respective target rest state of the respective target polygon, a respective source rest state of a respective source polygon of the source mesh that corresponds to the respective target polygon, and a respective source pose of the respective source polygon.

5. The method of claim 4, wherein the respective target pose for each respective target polygon is stored as sculpt data associated with a target model corresponding to the target mesh.

6. The method of claim 1, wherein the second matrix comprises:
   a first row defining in-plane rotation;
   a second row defining the stretching; and
   a third row defining out-of-plane rotation.

7. The method of claim 1, wherein each of the first matrix, the third matrix, and the fourth matrix comprises:
   a first row defining in-plane rotation;
   a second row that does not define a transformation; and
   a third row defining out-of-plane rotation.

8. A non-transitory computer readable medium comprising instructions that, when executed by one or more processors of a computing system, cause the computing system to perform a method for sculpt transfer, the method comprising:
   identifying a source polygon of a source mesh that corresponds to a target polygon of a target mesh;
   determining a first matrix defining a first rotation that aligns a target rest state of the target polygon to a source rest state of the source polygon;
   determining a second matrix defining a linear transformation that aligns the source rest state to a source pose of the source polygon, wherein the linear transformation comprises rotating and stretching;
   determining a third matrix defining a second rotation that aligns the source pose to the target rest state;
   determining a fourth matrix defining a third rotation that aligns the source rest state to the source pose;
   determining a target pose of the target polygon by:
     applying the first matrix to the target polygon in the target rest state to produce a first intermediate state of the target polygon;
     applying the second matrix to the first intermediate state of the target polygon to produce a second intermediate state of the target polygon;
     applying the third matrix to the second intermediate state of the target polygon to produce a third intermediate state of the target polygon; and
     applying the fourth matrix to the third intermediate state of the target polygon to produce the target pose; and
   generating an animation of the target mesh based on the target rest state and the target pose.

9. The non-transitory computer readable medium of claim 8, wherein the first matrix, the second matrix, the third matrix, and the fourth matrix are determined using singular value decomposition (SVD).

10. The non-transitory computer readable medium of claim 8, wherein the method further comprises:

determining delta values for vertices of the target polygon based on differences between the target rest state and the target pose; and storing the delta values as sculpt data associated with a target model corresponding to the target mesh.

11. The non-transitory computer readable medium of claim 8, wherein the method further comprises determining a respective target pose for each respective target polygon of the target mesh based on a respective target rest state of the respective target polygon, a respective source rest state of a respective source polygon of the source mesh that corresponds to the respective target polygon, and a respective source pose of the respective source polygon.

12. The non-transitory computer readable medium of claim 11, wherein the respective target pose for each respective target polygon is stored as sculpt data associated with a target model corresponding to the target mesh.

13. The non-transitory computer readable medium of claim 8, wherein the second matrix comprises:
a first row defining in-plane rotation;
a second row defining the stretching; and
a third row defining out-of-plane rotation.

14. The non-transitory computer readable medium of claim 8, wherein each of the first matrix, the third matrix, and the fourth matrix comprises:
a first row defining in-plane rotation;
a second row that does not define a transformation; and
a third row defining out-of-plane rotation.

15. A system, comprising:
one or more processors; and
a non-transitory computer readable medium comprising instructions that, when executed by one or more processors of a computing system, cause the computing system to perform a method for sculpt transfer, the method comprising:
identifying a source polygon of a source mesh that corresponds to a target polygon of a target mesh;
determining a first matrix defining a first rotation that aligns a target rest state of the target polygon to a source rest state of the source polygon;
determining a second matrix defining a linear transformation that aligns the source rest state to a source pose of the source polygon, wherein the linear transformation comprises rotating and stretching;
determining a third matrix defining a second rotation that aligns the source pose to the target rest state;
determining a fourth matrix defining a third rotation that aligns the source rest state to the source pose;
determining a target pose of the target polygon by:
applying the first matrix to the target polygon in the target rest state to produce a first intermediate state of the target polygon;
applying the second matrix to the first intermediate state of the target polygon to produce a second intermediate state of the target polygon;
applying the third matrix to the second intermediate state of the target polygon to produce a third intermediate state of the target polygon; and
applying the fourth matrix to the third intermediate state of the target polygon to produce the target pose; and
generating an animation of the target mesh based on the target rest state and the target pose.

16. The system of claim 15, wherein the first matrix, the second matrix, the third matrix, and the fourth matrix are determined using singular value decomposition (SVD).

17. The system of claim 15, wherein the method further comprises:
determining delta values for vertices of the target polygon based on differences between the target rest state and the target pose; and
storing the delta values as sculpt data associated with a target model corresponding to the target mesh.

18. The system of claim 15, wherein the method further comprises determining a respective target pose for each respective target polygon of the target mesh based on a respective target rest state of the respective target polygon, a respective source rest state of a respective source polygon of the source mesh that corresponds to the respective target polygon, and a respective source pose of the respective source polygon.

19. The system of claim 18, wherein the respective target pose for each respective target polygon is stored as sculpt data associated with a target model corresponding to the target mesh.

20. The system of claim 15, wherein the second matrix comprises:
a first row defining in-plane rotation;
a second row defining the stretching; and
a third row defining out-of-plane rotation.

* * * * *